US010355328B2

(12) United States Patent
Song et al.

(10) Patent No.: US 10,355,328 B2
(45) Date of Patent: Jul. 16, 2019

(54) METHOD AND APPARATUS FOR CONTROLLING COOLING OF BATTERY PACK

(71) Applicant: SAMSUNG ELECTRONICS CO., LTD., Suwon-si (KR)

(72) Inventors: Tae Won Song, Yongin-si (KR); Jinho Kim, Yongin-si (KR); DongKee Sohn, Seoul (KR); Taejung Yeo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 799 days.

(21) Appl. No.: 14/938,062

(22) Filed: Nov. 11, 2015

(65) Prior Publication Data

US 2016/0285144 A1  Sep. 29, 2016

(30) Foreign Application Priority Data

Mar. 23, 2015  (KR) .................. 10-2015-0040231

(51) Int. Cl.
*H01M 10/20* (2006.01)
*H01M 10/63* (2014.01)
*H01M 10/6557* (2014.01)
*H01M 10/613* (2014.01)
*H01M 10/48* (2006.01)

(52) U.S. Cl.
CPC .......... *H01M 10/63* (2015.04); *H01M 10/48* (2013.01); *H01M 10/613* (2015.04); *H01M 10/6557* (2015.04)

(58) Field of Classification Search
CPC .............. H01M 10/63; H01M 10/613; H01M 10/6557; H01M 10/48; H01M 10/50; H01M 2/08; H01M 2/10; B60W 10/26; B60K 6/28; B60K 6/445; H02M 7/48
USPC ........................................... 429/120
See application file for complete search history.

(56) References Cited

U.S. PATENT DOCUMENTS

| | | | |
|---|---|---|---|
| 7,924,562 B2 * | 4/2011 | Soma ............... | B60K 6/445 320/107 |
| 2004/0081872 A1 | 4/2004 | Herman et al. | |
| 2007/0034523 A1 * | 2/2007 | Yerazunis .......... | F04B 17/00 205/633 |
| 2012/0107708 A1 | 5/2012 | Takahashi et al. | |
| 2013/0004820 A1 | 1/2013 | Tennessen et al. | |
| 2016/0079637 A1 * | 3/2016 | Nemesh ............ | H01M 10/625 429/62 |

FOREIGN PATENT DOCUMENTS

| | | |
|---|---|---|
| JP | 2007-311290 A | 11/2007 |
| JP | 2009-117264 A | 5/2009 |
| JP | 2014-103099 A | 6/2014 |
| KR | 10-0793495 B1 | 1/2008 |
| KR | 10-2010-0036762 A | 4/2010 |
| KR | 10-2011-0060490 A | 6/2011 |
| KR | 10-2013-0019532 A | 2/2013 |

(Continued)

*Primary Examiner* — Anthony R Jimenez
(74) *Attorney, Agent, or Firm* — NSIP Law

(57) ABSTRACT

A method and apparatus for controlling cooling of a battery pack are disclosed, in which the method includes determining a load state of the battery pack and selectively controlling a supply of a cooling fluid to cooling paths disposed among battery cells included in the battery pack.

25 Claims, 14 Drawing Sheets

(56) References Cited

FOREIGN PATENT DOCUMENTS

| KR | 10-2014-0026961 A | 3/2014 |
|----|-------------------|--------|
| KR | 10-2014-0034352 A | 3/2014 |
| KR | 10-1371741 B1     | 3/2014 |
| KR | 10-2014-0058759 A | 5/2014 |

* cited by examiner

METHOD AND APPARATUS FOR CONTROLLING COOLING OF BATTERY PACK

CROSS-REFERENCE TO RELATED APPLICATION(S)

This application claims the benefit under 35 USC 119(a) of Korean Patent Application No. 10-2015-0040231, filed on Mar. 23, 2015, in the Korean Intellectual Property Office, the entire disclosure of which is incorporated herein by reference for all purposes.

BACKGROUND

1. Field

The following description relates to a method and an apparatus for controlling cooling of a battery pack.

2. Description of Related Art

A high-voltage battery pack including a plurality of battery cells. The battery pack may generate a considerable amount of heat during charging or discharging. The heat generated from the battery pack may deteriorate a performance of the battery or shorten a life of the battery. Thus, maintaining a constant temperature of the battery is useful for continued use of the battery. To maintain a constant temperature of the battery, a cooling apparatus may be applied to externally transmit the heat.

A plurality of high-capacity battery cells may be used for a battery pack when a system requires a high capacity and high power. Accordingly, an amount of heat generated may increase. Thus, a high cooling performance of a cooling apparatus may be a prerequisite for stable operation of the system. Here, a temperature difference may occur among the battery cells in the battery pack causing performance and life span differences among the battery cells in the battery pack.

The battery cells in the battery pack may have a high-temperature portion and a low-temperature portion. Thus, it becomes harder to handle the temperature difference among the battery cells by supplying a cooling fluid identically to the high-temperature portion and the low-temperature portion. Further, such a temperature difference may increase, in a low load state, due to a reduction in a flow of the cooling fluid.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of cooling a battery pack, the method including determining a load state of the battery pack, and selectively controlling a supply of a cooling fluid to cooling paths disposed among battery cells comprised in the battery pack, based on the load state of the battery pack.

The determining of the load state of the battery pack may include determining the load state of the battery pack based on a temperature of the battery pack.

The controlling may include controlling a supply of the cooling fluid to a first cooling path, and controlling a supply of the cooling fluid to a second cooling path based on the load state of the battery pack.

The controlling may include controlling a supply of different cooling fluids to the cooling paths.

The cooling paths may include a first cooling path and a second cooling path passing through a region different from a region of the battery pack through which the first cooling path passes.

The first cooling path may be disposed to circulate the cooling fluid starting from a central region of the battery pack.

The cooling paths may include a first cooling path and a second cooling path passing through a region having a temperature of the battery cells lower than a temperature of a region through which the first cooling path passes.

The cooling paths may include a first cooling path disposed adjacent to a ground contact portion of the battery cells and a second cooling path at a distance from the ground contact portion.

The second cooling path may be separate from the first cooling path.

In another general aspect, there is provided an apparatus for cooling a battery pack, the apparatus including a determiner configured to determine a load state of the battery pack, and a controller configured to selectively control a supply of a cooling fluid to cooling paths disposed among battery cells in the battery pack, based on the load state of the battery pack.

The determiner may be further configured to determine the load state of the battery pack based on a temperature of the battery pack.

The determiner may be further configured to determine the load state of the battery pack to be a high load state in response to a temperature of the battery pack exceeding a threshold, and the controller may be further configured to control a supply of a cooling fluid to a first cooling path and to a second cooling path based on the load state of the battery pack.

The controller may be further configured to control a supply of different cooling fluids to the cooling paths.

The cooling paths may include a first cooling path and a second cooling path passing through a region different from a region of the battery pack through which the first cooling path passes.

The first cooling path may be disposed to circulate a cooling fluid starting from a central region of the battery pack.

The cooling paths may include a first cooling path and a second cooling path passing through a region having a temperature of the battery cells lower than a temperature of a region through which the first cooling path passes.

The cooling paths may include a first cooling path disposed adjacent to a ground contact portion of the battery cells and a second cooling path at a distance from the ground contact portion.

The first cooling path may include first members disposed parallel to each other and connected to each other by at least one orthogonal second member, and the first members disposed in a central region of the battery pack may be closer to each other than the first members disposed in an outer region of the battery pack.

In another general aspect, there is provided an apparatus for cooling a battery pack, the apparatus including the battery pack comprising battery cells, cooling paths passing among the battery cells, and a controller configured to control a supply of a cooling fluid to the cooling paths based on a load state of the battery pack.

The cooling paths may include a first cooling path and a second cooling path disposed by a side of the battery cells having a temperature lower than a temperature of a region containing the first cooling path.

The controller may be further configured to supply a greater amount of the cooling fluid, in response to an increase in a load of the battery pack, and the second cooling path may include a check valve configured to permit the flow of the cooling fluid with a hydraulic pressure greater than or equal to a threshold.

The controller may include a first pump configured to supply the cooling fluid to the first cooling path, and a second pump configured to supply the cooling fluid to the second cooling path, in response to a load of the battery pack being greater than or equal to a predetermined load.

In another general aspect, there is provided an apparatus for cooling a battery pack, the apparatus including cooling paths disposed among battery cells in the battery pack, check valves disposed in each cooling path to regulate the flow of cooling fluid and each check valve is configured to permit the flow of cooling fluid, in response to a hydraulic pressure being greater than or equal to a threshold, and a controller configured to supply the cooling fluid to the cooling paths at varying hydraulic pressure based on a temperature of the battery pack.

Other features and aspects will be apparent from the following detailed description, the drawings, and the claims.

Figure 1:
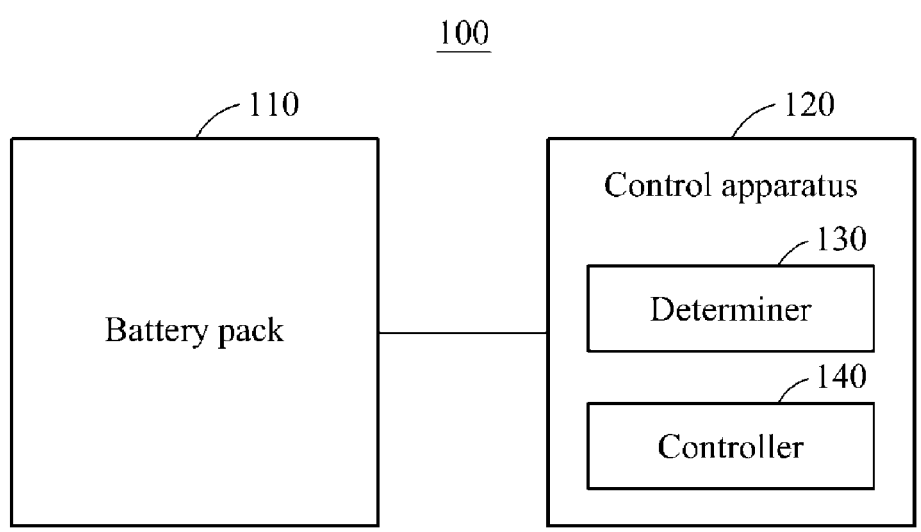
FIG. 1 is a diagram illustrating an example of a system for controlling cooling of a battery pack.

Throughout the drawings and the detailed description, unless otherwise described or provided, the same drawing reference numerals refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations is described as an example; the sequence of operations is not limited to that set forth herein and may be changed as is known in the art, with the exception of steps and/or operations that necessarily occur in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure is thorough, complete, and conveys the full scope of the disclosure to one of ordinary skill in the art.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "include" and/or "have," when used in this disclosure, specify the presence of stated features, integers, steps, operations, elements, components or combinations thereof, but do not preclude the presence or addition of one or more other features, integers, steps, operations, elements, components, and/or groups thereof.

In addition, terms such as first, second, A, B, (a), (b), and the like may be used herein to describe components. Each of these terminologies is not used to define an essence, order or sequence of a corresponding component but used merely to distinguish the corresponding component from other component(s).

FIG. 1 is a diagram illustrating an example of an apparatus for controlling cooling of a battery pack. Hereinafter, the apparatus will be referred to as a battery pack cooling control apparatus 100.

Referring to FIG. 1, the battery pack cooling control apparatus 100 includes a battery pack 110 and a control apparatus 120, which is interchangeably referred to as an apparatus for controlling cooling of a battery pack or a battery pack cooling control apparatus.

The battery pack 110 includes a plurality of cooling paths to cool battery cells included in the battery pack 110.

In an example, the cooling paths in the battery pack 110 may be disposed based on a temperature of the battery cells in the battery pack 110. For example, a first cooling path may be disposed on a side adjacent to a ground contact portion and having a relatively high temperature of the battery cells in the battery pack 110, and a second cooling path may be disposed on a side remote from the ground contact portion and having a relatively low temperature of the battery cells. In another example, the first cooling path may be disposed in a central portion of the battery pack 110 in which a temperature of the battery pack 110 is relatively high, and the second cooling path may be disposed in an outer portion of the battery pack 110 in which a temperature of the battery pack 110 is relatively low. Disposing the cooling paths will be further described with reference to FIGS. 3 through 6.

The control apparatus 120 includes a determiner 130 and a controller 140.

The determiner 130 determines a load state of the battery pack 110. The determiner 130 determines the load state of the battery pack 110 based on a temperature of the battery pack 110. For example, when the temperature of the battery pack 110 does not reach a predetermined maximum target temperature, the determiner 130 may determine the load state of the battery pack 110 to be a low load state. When the temperature of the battery pack 110 reaches the maximum target temperature, the determiner 130 may determine the load state of the battery pack 110 to be a high load state. A relationship between a load state of a battery pack and a temperature of the battery pack will be described with reference to FIG. 2.

The controller 140 controls a supply of a cooling fluid to be differently applied to the cooling paths disposed among the battery cells in the battery pack 110. For example, in the low load state of the battery pack 110, the controller 140 may control a supply of a cooling fluid to only one of the cooling paths. In another example, in the high load state of the battery pack 110, the controller 140 may control a simultaneous supply of the cooling fluid to all the cooling paths. In another example, the controller 140 may control a supply of different cooling fluids to the cooling paths.

The controller 140 controls a supply of the cooling fluid to the first cooling path based on the temperature of the battery pack 110. For example, when discharging of a battery is initiated, an initial temperature of the battery pack 110 may be lower than a preset minimum cooling temperature ($T_L$). When the temperature of the battery pack 110 is lower than the $T_L$, the controller 140 may not supply the cooling fluid to the first cooling path. When the temperature of the battery pack 110 is greater than or equal to the $T_L$, the controller 140 may supply the cooling fluid to the first cooling path.

The controller 140 may control a supply of the cooling fluid to the second cooling path separate from the first cooling path based on the load state of the battery pack 110. For example, in the low load state of the battery pack 110, the controller 140 may control the supply of the cooling fluid to the first cooling path to control the temperature of the battery pack 110. In the high load state of the battery pack 110, controlling the supply of the cooling fluid only to the first cooling path passing through the battery pack 110 may be insufficient to control the temperature of the battery pack 110. Thus, the controller 140 may control a supply of the cooling fluid to all the cooling paths passing the battery pack 110 to control the temperature of the battery pack 110.

The cooling paths disposed among the battery cells in the battery pack 110 may include the first cooling path and the second cooling path. The second cooling path may pass through a region different from a region through which the first cooling path passes. For example, the second cooling path may be disposed to pass through a region having a temperature of the battery cells lower than a temperature of the region through which the first cooling path passes in the battery pack 110. In another example, the first cooling path may be disposed to pass through a region having a relatively high temperature in the battery pack 110, and the second cooling path may be disposed to pass through a region having a relatively low temperature in the battery pack 110.

In an example, the controller 140 controls individual supplies of the cooling fluid to the cooling paths. For example, the controller 140 controls a supply of a first cooling fluid to a first cooling path while adjusting an amount of the first cooling fluid to be supplied, and a supply of a second cooling fluid to the second cooling path while adjusting an amount of the second cooling fluid to be supplied. The first cooling fluid and the second cooling fluid may be identical to or different from each other.

In another example, the controller 140 controls an amount of the cooling fluid to be supplied, and the cooling paths individually determine whether to allow the cooling fluid to pass based on a hydraulic pressure of the cooling fluid. For example, the cooling fluid may be set to pass through the first cooling path even at a low hydraulic pressure, and the cooling fluid may be set to pass through the second cooling path only at a hydraulic pressure greater than or equal to a threshold hydraulic pressure. Thus, in the low load state of the battery pack 110, the controller 140 controls the amount of the cooling fluid to be supplied to be small. Here, the cooling fluid may pass through the first cooling path, but not the second cooling path in response to a hydraulic pressure being determined to be less than the threshold hydraulic pressure. In the high load state of the battery pack 110, the controller 140 controls the amount of the cooling fluid to be supplied to be large. Here, the cooling fluid may pass through the first cooling path as well as the second cooling path in response to a hydraulic pressure being determined to be greater than or equal to the threshold hydraulic pressure.

Figure 2:
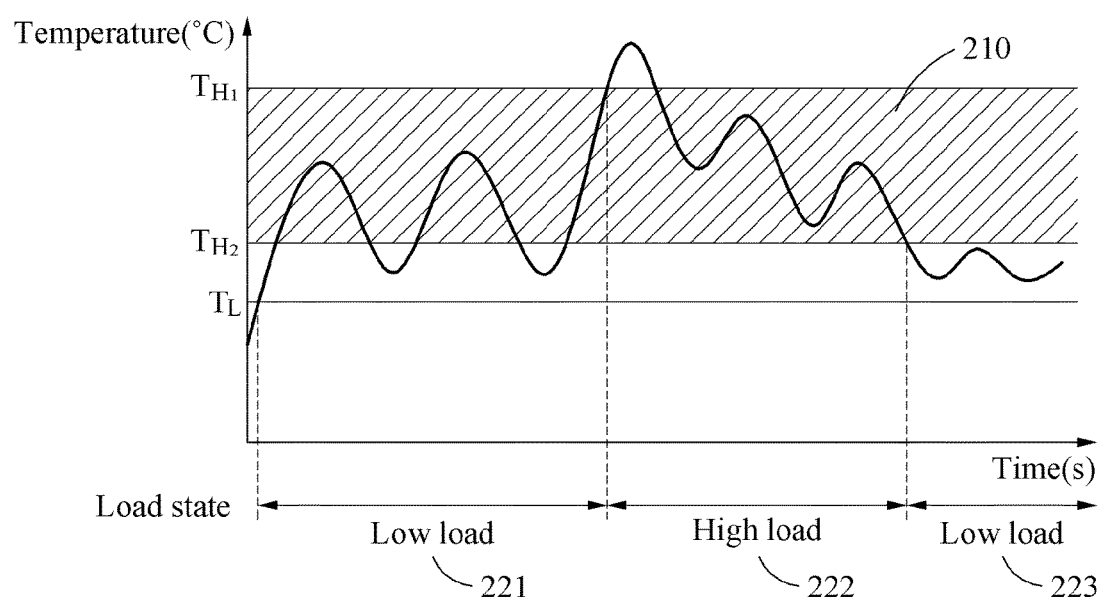
FIG. 2 is a diagram illustrating a temperature of a battery pack which is a reference used for determining a load state of the battery pack in an apparatus for controlling cooling of the battery pack.

FIG. 2 is a diagram illustrating an example of a temperature of a battery pack which is a reference used for determining a load state of the battery pack in a battery pack cooling control apparatus. The graph in FIG. 2 illustrates a time-based change in a temperature of a battery pack in response to use of a battery.

Referring to FIG. 2, in an initial operation of the battery, the battery pack cooling control apparatus, which is interchangeably referred to as the control apparatus 120 in FIG. 1, controls a supply of a cooling fluid to a cooling path based on a load state of the battery pack. Here, the load state of the battery pack may be determined based on a temperature of the battery pack.

In FIG. 2, a minimum cooling temperature ($T_L$) is the temperature at which cooling the battery pack is needed. A maximum target temperature ($T_{H1}$) and a minimum target temperature ($T_{H2}$) define a temperature range for a desirable operation of the battery. This temperature range may be preset.

When the temperature of the battery pack is greater than or equal to the $T_L$, the battery pack cooling control apparatus may determine the load state of the battery pack to be a low load state 221. For example, when the battery pack operates and the temperature of the battery pack exceeds 25° C., gradual cooling of the battery pack may be needed. However, the cooling may be controlled only with a single cooling path, such an example load state may be classified as a low load state. The battery pack cooling control apparatus may control a supply of the cooling fluid to a first cooling path and may also control an amount of the cooling fluid to be supplied.

When the temperature of the battery pack is greater than or equal to the $T_{H1}$, the battery pack cooling control apparatus may determine the load state of the battery pack to be a high load state 222. $T_{H1}$ may indicate a maximum temperature at which the battery pack may desirably supply power. $T_{H1}$ may be lower than a temperature at which the battery pack may be damaged due to a high temperature.

In the low load state 221, temperature of the battery pack may be managed by controlling the supply of the cooling fluid only to a single cooling path. In the high load state 222, the battery pack cooling control apparatus may control a supply of the cooling fluid to all the cooling paths in the battery pack. In an example, the battery pack cooling control apparatus may control a supply of the cooling fluid to a second cooling path while controlling an amount of the cooling fluid to be supplied in order to allow the temperature of the battery pack to be in a preset target temperature range 210. Here, the target temperature range 210 may indicate a temperature range in which the battery pack may desirably supply power.

When the temperature of the battery pack is less than or equal to the $T_{H2}$, the battery pack cooling control apparatus may determine the load state of the battery pack to once again be a low load state 223. When the battery pack returns to the low load state 223, the battery pack cooling control apparatus may control the supply of the cooling fluid to allow the cooling fluid to be supplied only to the first cooling path and suspend the supply of the cooling fluid to another cooling path, for example, the second cooling path.

FIGS. 3A through 6B are diagram illustrating planar views and cross-sectional views, of examples of a battery pack including battery cells among which cooling paths are disposed.

Figure 3A:
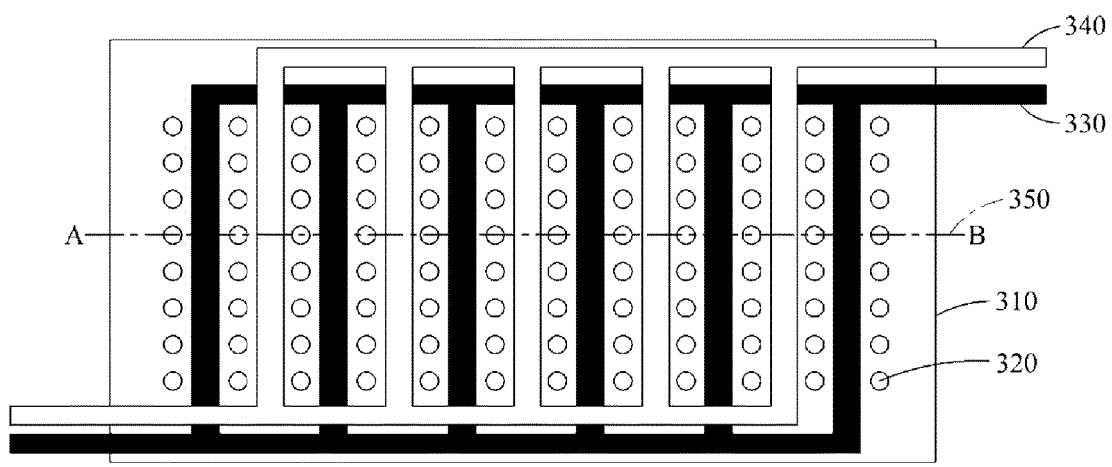
FIGS. 3A through 6B are diagram illustrating planar views and cross-sectional views of examples of a battery pack including battery cells among which cooling paths are disposed.
Figure 3B:
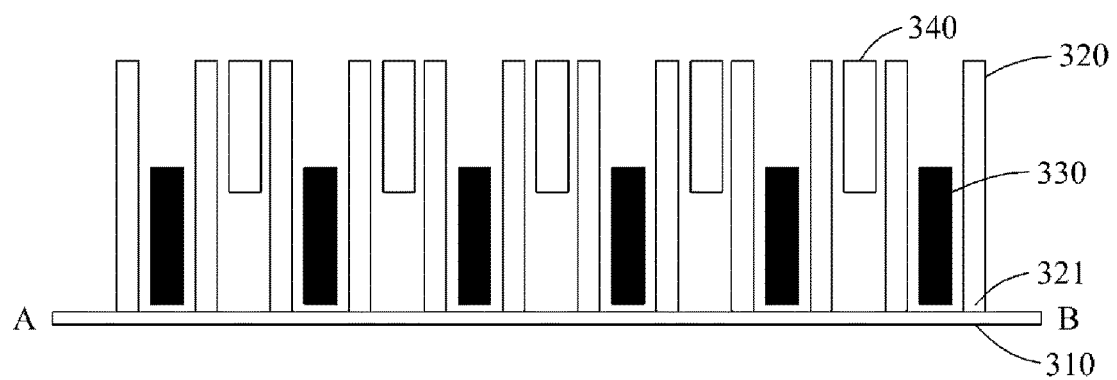

FIGS. 3A and 3B illustrate an example of a battery pack 310 including two cooling paths, for example, a first cooling path 330 and a second cooling path 340. For ease of description, a plurality of cooling paths is illustrated as the two cooling paths 330 and 340. In another examples, three or more cooling paths may be provided.

Referring to FIGS. 3A and 3B, the battery pack 310 includes a plurality of battery cells 320. The battery cells 320 are connected to the battery pack 310 to supply electrical charges.

FIG. 3A is a planar view of the battery pack 310, and FIG. 3B is a cross-sectional view of the battery pack 310 illustrated based on an A-B line 350 of FIG. 3A. In an example, the cooling paths 330 and 340 may be disposed on a side of the battery cells 320 in the battery pack 310.

A ground contact portion 321, which connects the battery cells 320 to the battery pack 310 may generate a relatively greater amount of heat than other portions of the battery cells 320 during transmission of electrical charges. A region adjacent to the ground contact portion 321 may be referred to as a high-temperature portion of the battery cells 320. A region remote from the ground contact portion 321 may be referred to as a low-temperature portion of the battery cells 320. The first cooling path 330 may be disposed along a side of the high-temperature portion adjacent to the ground contact portion 321 on the side of the battery cells 320, and the second cooling path 340 may be disposed along a side of the low-temperature portion remote from the ground contact portion 321 on the side of the battery cells 320.

In another example, when the number of cooling paths is three or more, the cooling paths may be disposed in the high-temperature portion, the low-temperature portion, and at least one middle portion of the battery cells 320.

In a low load state of the battery pack 310, a temperature may increase starting from a portion adjacent to the ground contact portion 321 of the battery cells 320. The battery pack cooling control apparatus may control a supply of a cooling fluid to the first cooling path 330 disposed adjacent to the ground contact portion 321. For example, when operation of the battery pack 310 is initiated, an overall temperature of the battery cells 320 may not increase, but only a temperature of the battery cells disposed adjacent to the ground contact portion 321 may increase. Cooling the low-temperature portion of the battery cells 320 may not be needed and the battery pack cooling control apparatus may control the supply of the cooling fluid only to the first cooling path 330 disposed along the side of the high-temperature portion of the battery cells 320.

In a high load state of the battery pack 310, a temperature of all portions of the battery cells 320 may increase. The battery pack cooling control apparatus may control the supply of the cooling fluid to both the first cooling path 330 and the second cooling path 340 to cool all portions of the battery cells 320. For example, when the battery is being used in a vehicle, and a driver increases an output of an electric vehicle while in motion, a temperature of the battery cells 320 may increase in all portions of the battery cells 320 irrespective of the high-temperature portion and the low-temperature portion. Here, the battery pack cooling control apparatus may control the supply of the cooling fluid to both the first cooling path 330 disposed along the side of the high-temperature portion of the battery cells 320 and the second cooling path 340 disposed along the side of the low-temperature portion of the battery cells 320.

Figure 4A:
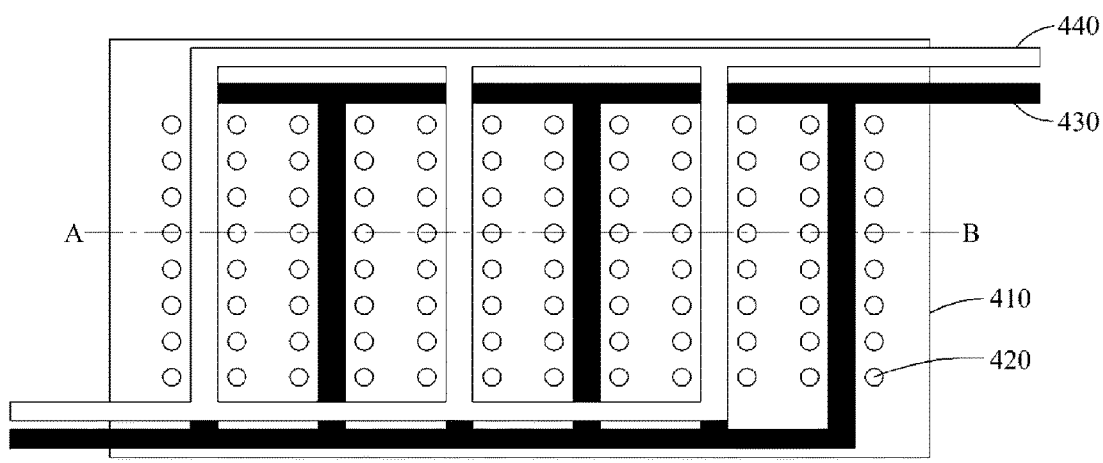
Figure 4B:
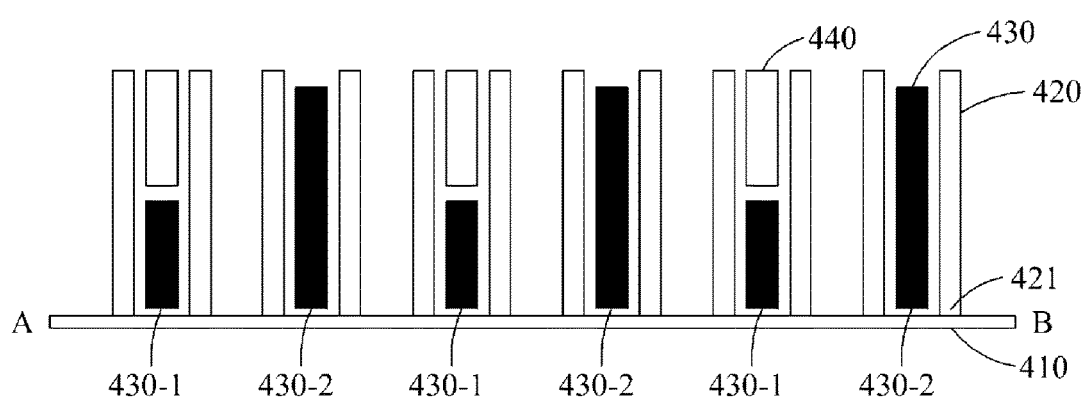

FIGS. 4A and 4B illustrate another example of a battery pack 410 including two cooling paths, for example, a first cooling path 430 and a second cooling path 440. For ease of description, a plurality of cooling paths is illustrated as the two cooling paths 430 and 440. In other examples, three or more cooling paths may be provided.

FIG. 4A is a planar view of the battery pack 410, and FIG. 4B is a cross-sectional view of the battery pack 410 illustrated based on an A-B line of FIG. 4A.

In an example, the cooling paths 430 and 440 may be disposed on a side of battery cells 420 in the battery pack 410. Here, a first portion 430-1 of the first cooling path 430 may overlap a portion of the second cooling path 440. For example, the first portion 430-1 of the first cooling path 430 may be disposed adjacent to a ground contact portion 421, and the second cooling path 440 may be disposed immediately above the first portion 430-1.

Here, a shape and a size of a second portion 430-2 of the first cooling path 430 that does not overlap the second cooling path 440 may be formed in a shape and a size differing from the first portion 430-1 of the first cooling path 430. For example, the first portion 430-1 of the first cooling path 430 overlapping the second cooling path 440 may be disposed adjacent to the ground contact portion 421 of the battery cells 420, and the second portion 430-2 of the first cooling path 430 that does not overlap the second cooling path 440 may be disposed along an entire side of the battery cells 420.

In a low load state of the battery pack 410, a temperature may increase starting from a portion adjacent to the ground contact portion 421 of the battery cells 420. The battery pack cooling control apparatus may control a supply of a cooling fluid to the first cooling path 430 disposed adjacent to the ground contact portion 421. For example, when operation of the battery pack 410 is initiated, an overall temperature of the battery cells 420 may not increase, but only a temperature of the battery cells disposed adjacent to the ground contact portion 421 may increase. Here, cooling a low-temperature portion of the battery cells 420 may not be needed and the battery pack cooling control apparatus may control the supply of the cooling fluid only to the first cooling path 430 disposed adjacent to the ground contact portion 421 of the battery cells 420.

In a high load state of the battery pack 410, a temperature of all portions of the battery cells 420 may increase. The battery pack cooling control apparatus may control the supply of the cooling fluid to both the first cooling path 430 and the second cooling path 440 to cool the all portions of the battery cells 420. For example, when a driver increases an output of an electric vehicle during a travel by the electric vehicle, a temperature of the battery cells 420 may increase in all portions of the battery cells 420 irrespective of the high-temperature portion and the low-temperature portion. Here, the battery pack cooling control apparatus may control the supply of the cooling fluid to both the first cooling path 430 disposed along the side of the ground contact portion 421 of the battery cells 420 and the second cooling path 440 disposed along the side of the low-temperature portion of the battery cells 420.

Figure 5A:
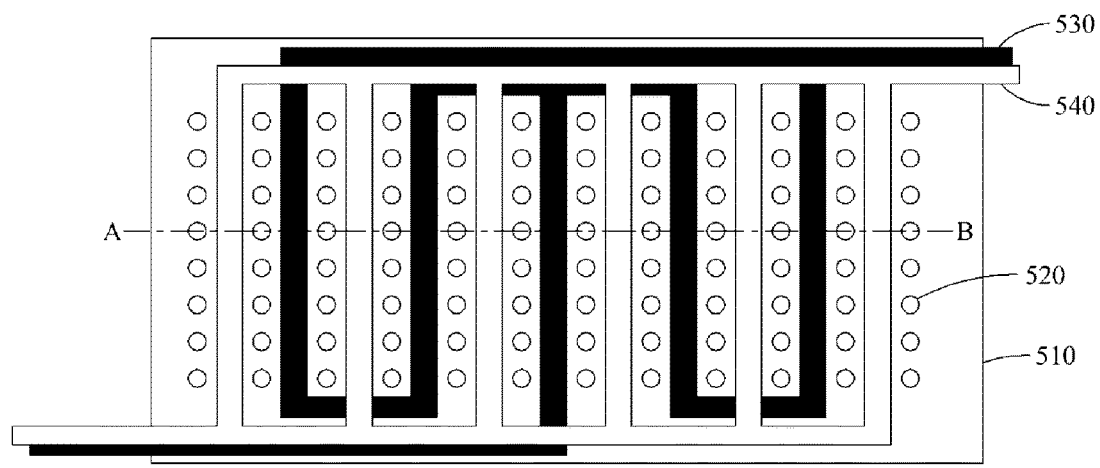
Figure 5B:
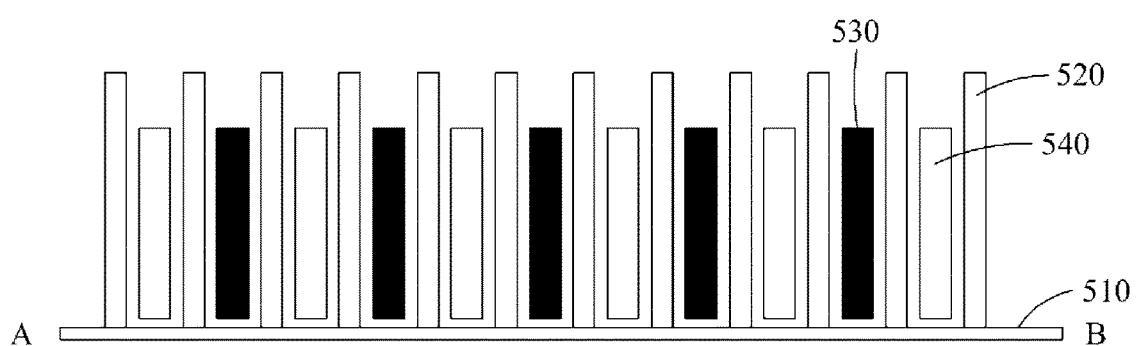

FIGS. 5A and 5B illustrate another example of a battery pack 510 including two cooling paths, for example, a first cooling path 530 and a second cooling path 540. For ease of description, a plurality of cooling paths is illustrated as the two cooling paths 530 and 540. In another example, at least three cooling paths may be provided.

FIG. 5A is a planar view of the battery pack 510, and FIG. 5B is a cross-sectional view of the battery pack 510 illustrated based on an A-B line of FIG. 5A.

In an example, the cooling paths 530 and 540 may be disposed on a side of battery cells 520 in the battery pack 510. The battery pack 510 may contain a portion in which a considerable amount of heat is generated. For example, a considerable amount of heat may be generated from a central portion of the battery pack 510. Thus, the first cooling path 530 may be disposed to first pass through the central portion of the battery pack 510. A cooling fluid passing through the first cooling path 530 may pass through the central portion of the battery pack 510 having a relatively high temperature, and then pass through an outer side of the battery pack 510 having a relatively low temperature. The efficiency of the heat exchange may be improved because the cooling fluid first passes through a portion of the first cooling path 530 disposed in a region having a relatively high temperature when a temperature of the cooling fluid is low. The cooling fluid passes through a portion of the first cooling path 530 disposed in a region having a relatively low temperature in the battery pack 510 after the temperature of the cooling fluid increases. In addition, a temperature difference among the battery cells 520 in all regions of the battery pack 510 may be minimized and thus, a performance and an expected life of the battery pack 510 may be improved.

The second cooling path 540 may be disposed on a side of the battery cells 520 through which the first cooling path 530 does not pass.

In a low load state of the battery pack 510, a temperature the battery pack 510 may increase starting from the central portion the battery pack 510. The battery pack cooling control apparatus may control the supply of the cooling fluid to the first cooling path 530 passing the central portion of the battery pack 510.

In a high load state of the battery pack 510, a temperature of all regions or portions of the battery pack 510 may increase. The battery pack cooling control apparatus may control the supply of the cooling fluid to both the first cooling path 530 and the second cooling path 540 to cool all regions of the battery pack 510.

Figure 6A:
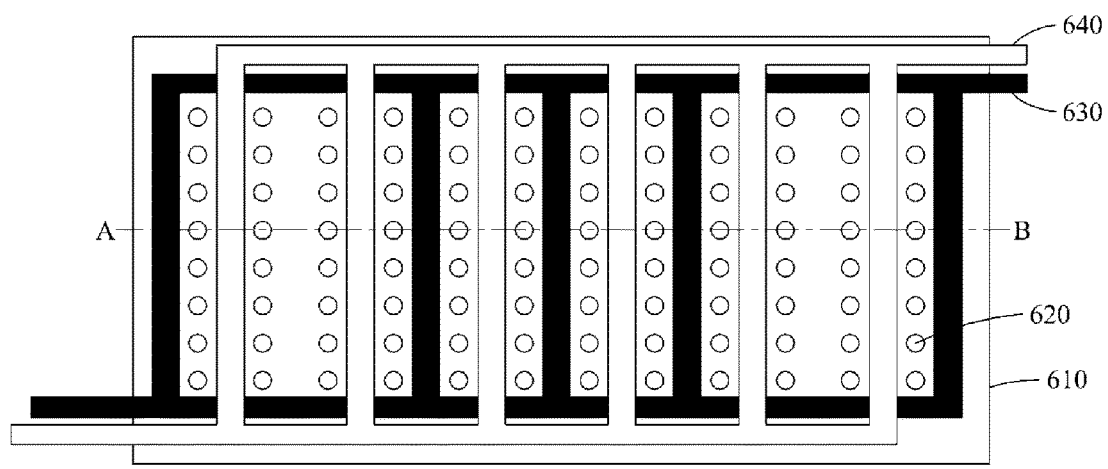
Figure 6B:
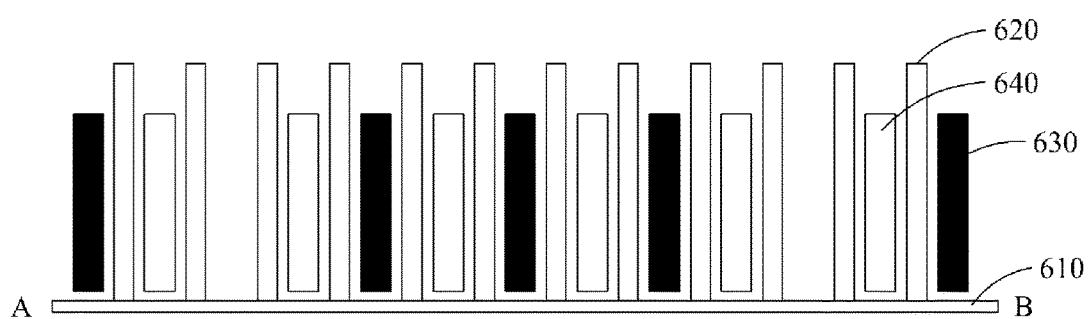

FIGS. 6A and 6B illustrate another example of a battery pack 610 including two cooling paths, for example, a first cooling path 630 and a second cooling path 640. For ease of description, a plurality of cooling paths is illustrated as the two cooling paths 630 and 640. In another example, at least three cooling paths may be provided.

FIG. 6A is a planar view of the battery pack 610, and FIG. 6B is a cross-sectional view of the battery pack 610 illustrated based on an A-B line of FIG. 6A.

In an example, the cooling paths 630 and 640 may be disposed on a side of battery cells 620 in the battery pack 610. The battery pack 610 may contain a portion where a considerable amount of heat is generated. For example, a considerable amount of heat may be generated from a central portion of the battery pack 610. Thus, the first cooling path 630 may be disposed to pass through a relatively large portion of the central portion of the battery pack 610. The first cooling path 630 may be arranged such that the portions of the first cooling path 630 in the central portion of the battery pack 610 are disposed to be close to each other. The first cooling path 630 may be widely disposed to have a great distance among the portions of the first cooling path 630 in an outer portion of the battery pack 610.

The second cooling path 640 may be disposed on a side of the battery cells 620 through which the first cooling path 630 does not pass. In another example, the second cooling path 640 may be disposed along a side of a low-temperature portion of the battery cells 620 through which the first cooling path 630 passes.

In a low load state of the battery pack 610, a temperature may increase starting from the central portion the battery pack 610. The battery pack cooling control apparatus may control a supply of a cooling fluid to the first cooling path 630 of which the portions are disposed closed to each other in the central portion of the battery pack 610.

In a high load state of the battery pack 610, a temperature of all regions or portions of the battery pack 610 may increase. The battery pack cooling control apparatus may control the supply of the cooling fluid to both the first cooling path 630 and the second cooling path 640 to cool the all regions of the battery pack 610.

Figure 7:
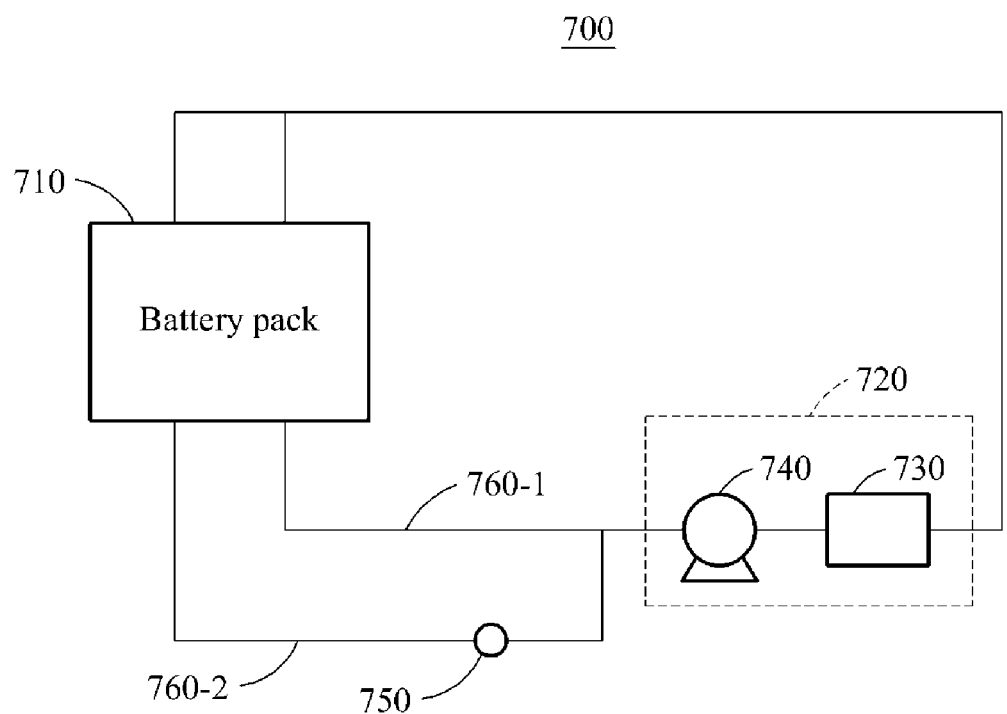
FIGS. 7 and 8 are diagrams illustrating examples of a system for controlling cooling of a battery pack including a control pump.
Figure 8:
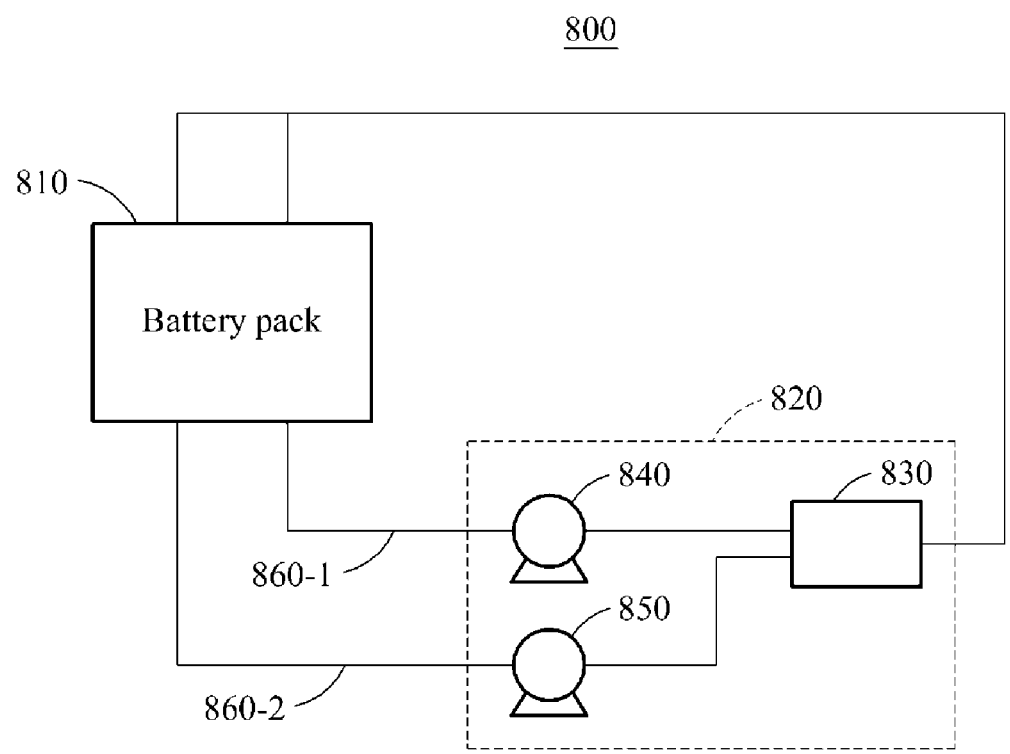

FIGS. 7 and 8 are diagrams illustrating examples of a battery pack cooling control system including a control pump. Referring to FIG. 7, a battery pack cooling control system 700 includes a battery pack 710, a control apparatus 720, and cooling paths, for example, a first cooling path 760-1 and a second cooling path 760-2. The control apparatus 720 includes a determiner 730 and a pump 740.

The determiner 730 determines a load state of the battery pack 710. In an example, the load state of the battery pack 710 may be determined based on a temperature of the battery pack 710.

The temperature at which cooling of the battery pack 710 is needed, $T_L$, and a temperature range for a desirable operation of a battery, from $T_{H1}$ to $T_{H2}$, may be preset.

For example, when the temperature of the battery pack 710 becomes greater than or equal to the $T_L$, the determiner 730 of the control apparatus 720 may determine the load state of the battery pack 710 to be a low load state. In the low load state of the battery pack 710, the control apparatus 720 may control a supply of a cooling fluid to the first cooling path 760-1 while controlling an amount of the cooling fluid to be supplied.

When the temperature of the battery pack 710 is greater than or equal to the $T_{H1}$, the determiner 730 of the control apparatus 720 may determine the load state of the battery pack 710 to be a high load state. When the temperature of the battery pack 710 in the high load state is less than or equal to the $T_{H2}$, the determiner 730 of the control apparatus 720 may determine that the load state of the battery pack 710 returns to the low load state.

The pump 740 configured to supply the cooling fluid adjusts an amount of the cooling fluid to be supplied based on the load state of the battery pack 710.

As illustrated in FIG. 7, the second cooling path 760-2 includes a check valve 750 operating based on a hydraulic pressure of the cooling fluid. For example, when the hydraulic pressure of the cooling fluid supplied through the pump 740 is low, the check valve 750 may not allow the cooling fluid to flow in the second cooling path 760-2. Thus, when the hydraulic pressure of the cooling fluid supplied through the pump 740 is low, the cooling fluid may flow only in the first cooling path 760-1. When the hydraulic pressure of the cooling fluid supplied through the pump 740 is greater than or equal to a threshold value, the check valve 750 may allow the cooling fluid to also flow in the second cooling path 760-2.

The examples of the check valve 750 shown in FIG. 7 is only a non-exhaustive illustrations of the apparatus to control the flow of the cooling fluid in the cooling paths. Other apparatuses are considered to be well within the scope of the present disclosure. For example, the second cooling path 760-2 may include, in lieu of the check value 750, a proportional valve configured to control whether the cooling fluid passes through the second cooling path 760-2. In another example, the second cooling path 760-2 may include an ON/OFF valve. In another example, check valves rated for different hydraulic pressures may be disposed in more than one cooling path, i.e., in 760-1 and 760-2.

The battery pack cooling control system 700 may further include a heat exchanger (not shown). The heat exchanger may lower a temperature of the cooling fluid, which increases when the cooling fluid passes through the battery pack 710. In an example, two cooling loops may be formed by dividing a path of the cooling fluid passing through the battery pack 710. Thus, the heat exchanger may lower the increased temperature of the cooling fluid by allowing the cooling fluid to enter the heat exchanger through each loop.

In another example, the cooling fluid passing through the battery pack 710 through each cooling path may converge in a single path to form a single cooling loop.

Referring to FIG. 8, a battery pack cooling control system 800 includes a battery pack 810, a control apparatus 820, and cooling paths, for example, a first cooling path 860-1 and a second cooling path 860-2. For ease of description, the battery pack cooling control system 800 is shown with two cooling paths 860-1 and 860-2. However, the battery pack cooling control system 800 may include three or more cooling paths.

The control apparatus 820 includes a determiner 830 and pumps, for example, a first pump 840 and a second pump 850.

The determiner 830 determines a load state of the battery pack 810. In an example, the load state of the battery pack 810 may be determined based on a temperature of the battery pack 810. For example, when the temperature of the battery pack 810 does not reach a preset target temperature range, the load state of the battery pack 810 may be determined to be a low load state. When the temperature of the battery pack 810 is in the target temperature range, the load state of the battery pack 810 may be determined to be a high load state.

The pumps 840 and 850 adjust an amount of a cooling fluid to be supplied based on the determined load state of the battery pack 810.

In an example, the control apparatus 820 may include the first pump 840 configured to supply the cooling fluid to the first cooling path 860-1. In the low load state, the control apparatus 820 may control the supply of the cooling fluid only using the first pump 840. The control apparatus 820 may include the second pump 850 configured to supply the cooling fluid to the second cooling path 860-2.

In the high load state, the control apparatus 820 may control the supply of the cooling fluid using both the first pump 840 and the second pump 850. When a load of the battery pack 810 increases, the control apparatus 820 may allow both the first pump 840 and the second pump 850 to operate and supply the cooling fluid to the first cooling path 860-1 and the second cooling path 860-2, respectively.

The battery pack cooling control system 800 may further include a heat exchanger (not shown). The heat exchanger may lower a temperature of the cooling fluid, which increases when the cooling fluid passes through the battery pack 810.

In an example, two individual cooling loops may be formed through division of a path of the cooling fluid passing through the battery pack 810. Thus, the heat exchanger may lower the increased temperature of the cooling fluid by allowing the cooling fluid to enter the heat exchanger through each loop.

In another example, the cooling fluid passing through the battery pack 810 through each cooling path may converge in a single path to form a single cooling loop.

Figure 9:
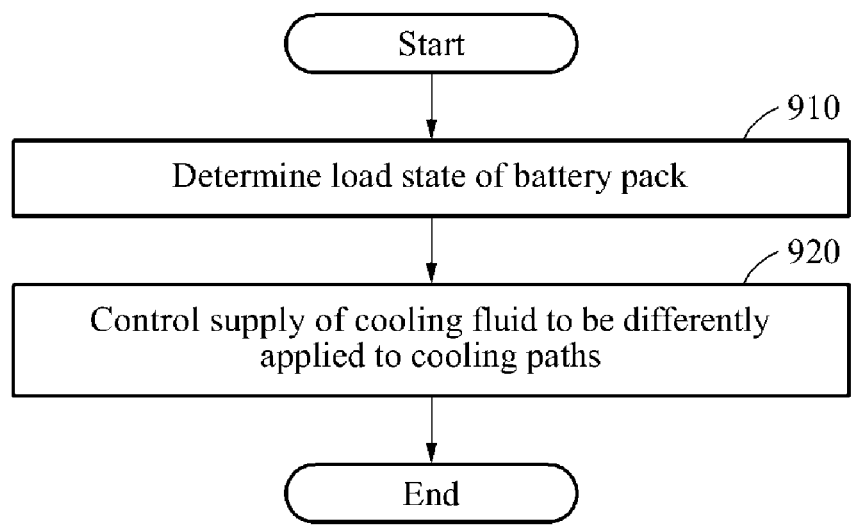
FIG. 9 is a diagram illustrating an example of a method of controlling cooling of a battery pack.

FIG. 9 is a diagram illustrating an example of a method of controlling cooling of a battery pack. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. The above description of FIGS. 1-8, is also applicable to FIG. 9, and is incorporated herein by reference. Thus, the above description may not be repeated here.

Referring to FIG. 9, in 910, a load state of a battery pack is determined. The load state of the battery pack may be determined based on a temperature of the battery pack. For example, when the temperature of the battery pack does not reach a preset maximum target temperature, a battery pack cooling control apparatus may determine the load state of the battery pack to be a low load state. When the temperature of the battery pack reaches the maximum target temperature, the battery pack cooling control apparatus may determine the load state of the battery pack to be a high load state.

In 920, a cooling fluid to be differently supplied to cooling paths disposed among battery cells included in the battery pack based on the determined load state of the battery pack.

For example, in the low load state, the battery pack cooling control apparatus may control the supply of cooling fluid to one of the cooling paths. In the high load state, the battery pack cooling control apparatus may control a simultaneous supply of the cooling fluid to all the cooling paths. In another example, the battery pack cooling control apparatus may control a supply of different cooling fluids to the cooling paths.

The controlling may include controlling a supply of the cooling fluid to a first cooling path, and controlling a supply of the cooling path to a second cooling path separate from the first cooling path based on the load state of the battery pack.

For example, when a battery starts discharging, a temperature of the battery pack may be lower than a $T_L$. Thus, when the temperature of the battery pack is lower than the $T_L$, the battery pack cooling control apparatus may not supply the cooling fluid to a cooling path. When the temperature of the battery pack is greater than or equal to the $T_L$, the battery pack cooling control apparatus may allow the cooling fluid to be supplied to the first cooling path.

In the low load state of the battery pack, the battery pack cooling control apparatus may control the temperature of the battery pack by allowing the cooling fluid to be supplied to the first cooling path. In the high load state of the battery pack, controlling the supply of the cooling path only to the first cooling path may be insufficient to control the temperature of the battery pack. Thus, the battery pack cooling control apparatus may control the temperature of the battery pack by allowing the cooling fluid to be supplied to more than one or all the cooling paths passing through the battery pack.

The controlling of the supply of cooling fluid may include controlling a supply of different cooling fluids to the cooling paths disposed among the battery cells in the battery pack.

Figure 10:
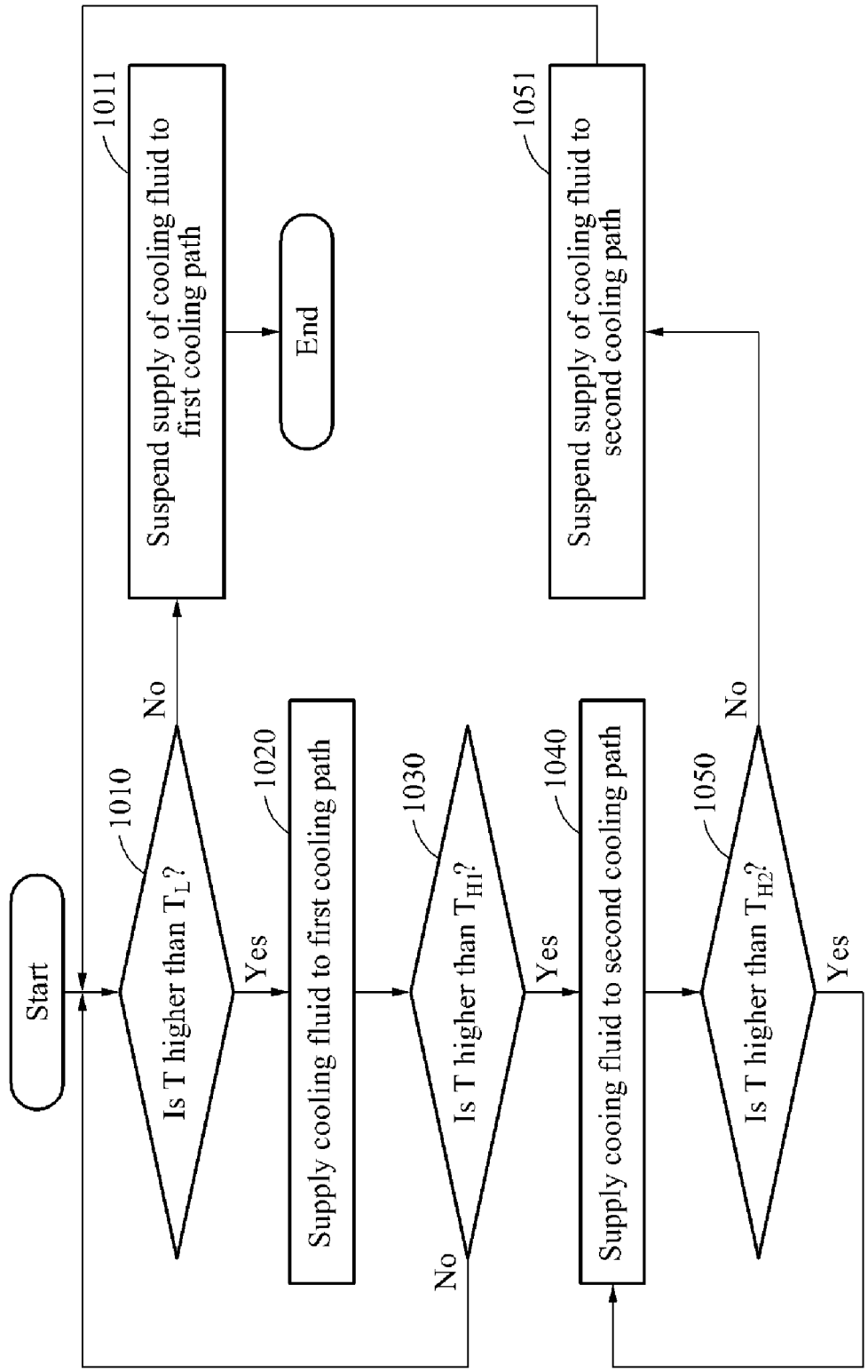
FIG. 10 is a diagram illustrating an example of a method of controlling cooling of a battery pack by determining a load state of the battery pack based on a temperature of the battery pack.

FIG. 10 is a diagram illustrating an example of a method of controlling cooling of a battery pack by determining a load state of the battery pack based on a temperature of the battery pack. The method of FIG. 10 may be performed by a battery pack cooling control apparatus. The operations in FIG. 10 may be performed in the sequence and manner as shown, although the order of some operations may be changed or some of the operations omitted without departing from the spirit and scope of the illustrative examples described. Many of the operations shown in FIG. 10 may be performed in parallel or concurrently. The above description of FIGS. 1-9, is also applicable to FIG. 10, and is incorporated herein by reference. Thus, the above description may not be repeated here.

Referring to FIG. 10, in 1010, the battery pack cooling control apparatus verifies whether a temperature (T) of a battery pack is higher than a minimum cooling temperature $T_L$. As described above, $T_L$ may indicate a minimum temperature at which cooling the battery pack is needed.

When the T is greater than or equal to the $T_L$, the battery pack cooling control apparatus may determine the load state of the battery pack to be a low load state. For example, when a battery operates and the T of the battery pack exceeds $T_L$, for example 25° C., cooling the battery pack may be needed. In such an example, controlling using a single cooling path may be possible and thus, the load state may be classified as the low load state.

In 1011, the battery pack cooling control apparatus allows a supply of a cooling fluid to a first cooling path to be suspended. For example, when the T becomes lower than the $T_L$ or when T is initially lower than the $T_L$, the battery pack cooling control apparatus may determine that the operation of the battery is suspended and thus, allow the supply of the cooling fluid to be suspended.

In 1020, when the T is higher than the $T_L$, the battery pack cooling control apparatus allows the cooling fluid to be supplied to the first cooling path.

In 1030, the battery pack cooling control apparatus verifies whether the T is higher than a maximum target temperature $T_{H1}$. The $T_{H1}$ may indicate a maximum temperature at which the battery pack desirably supplies power.

In the low load state, it may be possible to control the temperature of the battery pack using only one cooling path. However, in the high load state, using only one cooling path may be insufficient to control the temperature of the battery pack. Thus, whether the battery pack enters the high load state may be determined.

When the T is higher than the $T_{H1}$, operation 1040 may be performed. When the T is lower than the $T_{H1}$, the method may return to 1010.

In 1040, when the T is higher than the $T_{H1}$, the battery pack cooling control apparatus allows the cooling fluid to be supplied to a second cooling path.

In the high load state, the battery pack cooling control apparatus may control a supply of the cooling fluid to all cooling paths in the battery pack. In an example, the battery pack cooling control apparatus may control the supply of the cooling fluid to the second cooling path while controlling an amount of the cooling fluid to be supplied so that the temperature of the battery pack is in a preset target temperature range. Here, a target temperature may indicate a temperature at which the battery pack desirably supplies power.

In 1050, the battery pack cooling control apparatus verifies whether the T is higher than a minimum target temperature $T_{H2}$. When the T of the battery pack in the high load state is lower than or equal to the $T_{H2}$, the battery pack cooling control apparatus may determine that the load state of the battery pack becomes the low load state again.

When the T is higher than the $T_{H2}$, the method may return to 1040. When the T is lower than the $T_{H2}$, 1051 may be performed.

In 1051, when the T is lower than the $T_{H2}$, the battery pack cooling control apparatus allows the supply of the cooling fluid to the second cooling path to be suspended. Here, the battery pack cooling control apparatus may return to 1010 to verify whether the T of the battery pack is higher than the $T_L$.

The apparatuses, units, modules, devices, and other components illustrated that perform the operations described herein are implemented by hardware components. Examples of hardware components include controllers, sensors, generators, drivers and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array (FPGA), a programmable logic array, a microprocessor, an application-specific integrated circuit (ASIC), or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 9-10 that perform the operations described herein are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of cooling a battery pack, the method comprising:
   determining a load state of the battery pack; and
   selectively differently controlling respective supplies of a cooling fluid to cooling paths disposed among battery cells comprised in the battery pack, based on the load state of the battery pack,
   wherein the cooling paths comprise parallel cooling paths connected to each other by at least one orthogonal cooling path.

2. The method of claim 1, wherein the determining of the load state of the battery pack comprises determining the load state of the battery pack based on a temperature of the battery pack.

3. The method of claim 1, wherein the controlling comprises controlling a supply of different cooling fluids to the cooling paths.

4. The method of claim 1, wherein the cooling paths are isolated from each other.

5. The method of claim 1, further comprising determining, based on the determined load state of the battery pack, which of one or more selected cooling paths among the cooling paths to supply the cooling fluid,
   wherein the selective different controlling of the respective supplies of the cooling fluid includes select respective supply of the cooling fluid to the one or more selected cooling paths.

6. The method of claim 1, wherein the cooling paths comprise a first cooling path and a second cooling path passing through a region having a temperature of the battery cells lower than a temperature of a region through which the first cooling path passes.

7. The method of claim 1, wherein the cooling paths comprise a first cooling path disposed adjacent to a ground contact portion of the battery cells and a second cooling path at a distance from the ground contact portion.

8. The method of claim 1, wherein the controlling comprises:
   controlling a supply of the cooling fluid to a first cooling path; and
   controlling a supply of the cooling fluid to a second cooling path based on the load state of the battery pack.

9. The method of claim 8, wherein the second cooling path is separate from the first cooling path.

10. The method of claim 1, wherein the cooling paths comprise a first cooling path and a second cooling path passing through a region different from a region of the battery pack through which the first cooling path passes.

11. The method of claim 10, wherein the first cooling path is disposed to circulate the cooling fluid starting from a central region of the battery pack.

12. An apparatus for cooling a battery pack, the apparatus comprising:
    a processor configured to:
      determine a load state of the battery pack; and
      selectively differently control respective supplies of a cooling fluid to cooling paths disposed among battery cells in the battery pack, based on the load state of the battery pack,
      wherein the cooling paths comprise parallel cooling paths connected to each other by at least one orthogonal cooling path.

13. The apparatus of claim 12, wherein the processor is further configured to determine the load state of the battery pack based on a temperature of the battery pack.

14. The apparatus of claim 12, wherein the processor is further configured to:
    determine the load state of the battery pack to be a high load state in response to a temperature of the battery pack exceeding a threshold, and
    control a supply of a cooling fluid to a first cooling path and to a second cooling path based on the load state of the battery pack.

15. The apparatus of claim 12, wherein the processor is further configured to control a supply of different cooling fluids to the cooling paths.

16. The apparatus of claim 12, wherein the cooling paths comprise a first cooling path and a second cooling path passing through a region having a temperature of the battery cells lower than a temperature of a region through which the first cooling path passes.

17. The apparatus of claim 12, wherein the cooling paths comprise a first cooling path disposed adjacent to a ground contact portion of the battery cells and a second cooling path at a distance from the ground contact portion.

18. The apparatus of claim 12, wherein:
the cooling paths disposed in a central region of the battery pack are closer to each other than the cooling paths disposed in an outer region of the battery pack.

19. The apparatus of claim 12, wherein the cooling paths comprise a first cooling path and a second cooling path passing through a region different from a region of the battery pack through which the first cooling path passes.

20. The apparatus of claim 19, wherein the first cooling path is disposed to circulate a cooling fluid starting from a central region of the battery pack.

21. An apparatus for cooling a battery pack, the apparatus comprising:
the battery pack comprising battery cells;
cooling paths passing among the battery cells; and
a controller configured to selectively differently control respective supplies of a cooling fluid to the cooling paths based on a load state of the battery pack,
wherein the cooling paths comprise parallel cooling paths connected to each other by at least one orthogonal cooling path.

22. The apparatus of claim 21, wherein the cooling paths comprise a first cooling path and a second cooling path disposed by a side of the battery cells having a temperature lower than a temperature of a region containing the first cooling path.

23. The apparatus of claim 22, wherein the controller is further configured to supply a greater amount of the cooling fluid, in response to an increase in a load of the battery pack, and
the second cooling path comprises a check valve configured to permit a flow of the cooling fluid with a hydraulic pressure greater than or equal to a threshold.

24. The apparatus of claim 22, wherein the controller comprises:
a first pump configured to supply the cooling fluid to the first cooling path; and
a second pump configured to supply the cooling fluid to the second cooling path, in response to a load value of the battery pack being greater than or equal to a predetermined load value.

25. An apparatus for cooling a battery pack, the apparatus comprising:
plural cooling paths disposed among battery cells in the battery pack;
check valves disposed in each cooling path, of the plural cooling paths, to regulate a flow of cooling fluid and each check valve is configured to permit the flow of cooling fluid, in response to a hydraulic pressure being greater than or equal to a threshold; and
a controller configured to supply the cooling fluid to respective cooling paths, of the plural cooling paths, at respectively set varying hydraulic pressures based on a temperature of the battery pack.

* * * * *